(12) United States Patent
Mittal et al.

(10) Patent No.: US 12,549,377 B2
(45) Date of Patent: Feb. 10, 2026

(54) SYSTEMS AND METHODS FOR ON-DEVICE LOCATION HISTORY FOR CONTENT ANALYTICS

(71) Applicant: Google LLC, Mountain View, CA (US)

(72) Inventors: Pooja Mittal, Palo Alto, CA (US); Kumara Guruparan Tharmalingam, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 96 days.

(21) Appl. No.: 18/687,655

(22) PCT Filed: Feb. 9, 2023

(86) PCT No.: PCT/US2023/012702
§ 371 (c)(1),
(2) Date: Feb. 28, 2024

(87) PCT Pub. No.: WO2024/167494
PCT Pub. Date: Aug. 15, 2024

(65) Prior Publication Data
US 2024/0430098 A1     Dec. 26, 2024

(51) Int. Cl.
*H04L 9/32*     (2006.01)

(52) U.S. Cl.
CPC ................. *H04L 9/3239* (2013.01)

(58) Field of Classification Search
CPC .... G06Q 30/02; G06Q 30/0205; H04W 4/029
See application file for complete search history.

(56) References Cited

U.S. PATENT DOCUMENTS

| | | | |
|---|---|---|---|
| 8,429,013 B2 * | 4/2013 | Symons | G06Q 30/0205 705/14.57 |
| 11,334,680 B1 * | 5/2022 | Knox | G06F 21/602 |
| 2011/0246273 A1 | 10/2011 | Yarvis et al. | |
| 2012/0159637 A1 * | 6/2012 | Dove | G06F 21/6254 726/26 |
| 2016/0165403 A1 * | 6/2016 | Turner | H04L 51/222 455/456.3 |
| 2017/0046745 A1 * | 2/2017 | Zhu | G06Q 30/0269 |

(Continued)

OTHER PUBLICATIONS

International Search Report and Written Opinion for Application No. PCT/US2023/012702, mailed Aug. 16, 2023, 13 pages.

*Primary Examiner* — Olugbenga O Idowu
(74) *Attorney, Agent, or Firm* — DORITY & MANNING P.A.

(57) ABSTRACT

Example embodiments of the present disclosure provide for an example method for on-device location history for content analytics. The example method includes obtaining data associated with a first user and a second user. The example method includes generating content event groupings associated with the users. The example method includes a user device requesting the content event groupings. The example method includes obtaining de-identified content-location event pairs generated on the user device. The example method includes inputting the de-identified content-location event pairs into an attribution pipeline. The example method includes obtaining attribution data associated with conversions attributed to specific content-location event pairs.

20 Claims, 7 Drawing Sheets

(56) References Cited

U.S. PATENT DOCUMENTS

| | | | | |
|---|---|---|---|---|
| 2019/0251585 A1* | 8/2019 | Milton | ................ | G06F 16/9537 |
| 2020/0151282 A1* | 5/2020 | Paulsen | .............. | G06Q 30/0242 |
| 2020/0286111 A1* | 9/2020 | Milton | .................. | H04W 4/021 |
| 2021/0209623 A1* | 7/2021 | Maugans, III | ........ | H04L 67/535 |
| 2021/0240853 A1* | 8/2021 | Carlson | .................. | G16H 10/20 |

* cited by examiner

SYSTEMS AND METHODS FOR ON-DEVICE LOCATION HISTORY FOR CONTENT ANALYTICS

PRIORITY CLAIM

This application is based upon and claims the right of priority under 35 U.S.C. § 371 to International Application No. PCT/US2023/012702 filed on Feb. 9, 2023, which is incorporated by reference herein.

FIELD

The present disclosure relates generally to systems and methods for utilizing on-device location history for content analytics.

BACKGROUND

Computing devices can perform data processing and run machine learning models. Users can engage in various online and offline activities which can result in exposure of information to the user. Subsequent activities by a user can include visits to physical locations associated with exposure of information.

SUMMARY

Aspects and advantages of embodiments of the present disclosure will be set forth in part in the following description, or can be learned from the description, or can be learned through practice of the embodiments.

In one example aspect, the present disclosure provides for an example system for on-device location history for content analytics, including one or more processors and one or more memory device storing instructions that are executable to cause the one or more processors to perform operations. In some implementations, the one or more memory devices can include one or more transitory or non-transitory computer-readable media storing instructions that are executable to cause the one or more processors to perform operations. In the example system, the operations can include obtaining, by a computing system comprising one or more processors, data associated with at least a first user and a second user. In the example system, the operations can include generating, by the computing system and based at least in part on the data associated with the first user and the second user, a plurality of content event groupings. In the example system, the operations can include obtaining, by the computing system, from a client device, a request for transmission of data comprising the plurality of content event groupings. In the example system, the operations can include transmitting, by the computing system to the client device, content event data comprising the plurality of content event groupings. In the example system, the operations can include obtaining, by the computing system, data comprising a plurality of de-identified content-location event pairs. In the example system, the operations can include inputting, by the computing system, the plurality of de-identified content-location event pairs into an attribution pipeline. In the example system, the operations can include obtaining, by the computing system from the attribution pipeline, output comprising data indicative of conversions attributed to specific content-location event pairs.

In some embodiments of the example system, the de-identified content-location event pairs are generated on the client device by obtaining location event data from a location event database. In some embodiments of the example system, the de-identified content-location event pairs are generated on the client device by obtaining the plurality of content event groupings. In some embodiments of the example system, the de-identified content-location event pairs are generated on the client device by generating a plurality of content-location event pairs based on the location event data and the content event data.

In some embodiments of the example system, the de-identified content-location event pairs are generated on the client device by obtaining the plurality of content-location event pairs. In some embodiments of the example system, the de-identified content-location event pairs are generated on the client device by performing a first hash function on the plurality of content-location event pairs. In some embodiments of the example system, the de-identified content-location event pairs are generated on the client device by obtaining hashed data indicative of the plurality of de-identified content-location event pairs.

In some embodiments of the example system, the plurality of de-identified content-location event pairs are grouped based on an association with the first user or the second user.

In some embodiments of the example system, the first hash function is a keyless hash function.

In some embodiments of the example system, the location event data comprises at least one of a (i) time, (ii) location, (iii) visit start, (iv) visit duration, or (v) store identifier.

In some embodiments of the example system, the content event groupings comprise a first content event grouping composed of one or more content events associated with the first user and a second content event grouping composed of one or more content events associated with the second user.

In some embodiments of the example system, the one or more content events comprises data associated with at least one of a (i) time, (ii) location, (iii) visit start, (iv) visit duration, or (v) store identifier.

In some embodiments of the example system, the operations include storing the data obtained as output from the attribution pipeline in an attribution database. In some embodiments of the example system, the operations include using the stored data to (i) train one or more machine learned models and (ii) extrapolate a calculated attribution to content events.

In some embodiments of the example system, the data obtained as output from the attribution pipeline comprises at least one of (ii) a conversion or (ii) a click.

In some embodiments of the example system, the first user is associated with a first organization and the second user is associated with a second organization.

In some embodiments of the example system, the attribution pipeline comprises one or more attribution models.

In some embodiments of the example system, the one or more attribution models comprises at least one of: (i) a location determination model, (ii) a conversion determination model, (iii) a timeline model, or (iv) a data driven attribution model.

In some embodiments of the example system, the one or more attribution models comprises machine learned models.

In some embodiments of the example system, the attribution pipeline comprises applying a second hash function to the data obtained from the one or more attribution models.

In some embodiments of the example system, the second hash function comprises a keyed hash function.

In an example aspect, the present disclosure provides for an example computer-implemented method. The example method includes obtaining data associated with at least a first user and a second user. The example method includes generating, based at least in part on the data associated with the first user and the second user, a plurality of content event groupings. The example method includes obtaining, from a client device, a request for transmission of data comprising the plurality of content event groupings. The example method includes transmitting, to the client device, content event data comprising the plurality of content event groupings. The example method includes obtaining data comprising a plurality of de-identified content-location event pairs. The example method includes inputting the plurality of de-identified content-location event pairs into an attribution pipeline. The example method includes obtaining, from the attribution pipeline, output comprising data indicative of conversions attributed to specific content-location event pairs.

In an example aspect, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining, by a computing system comprising one or more processors, data associated with at least a first user and a second user. In the example transitory or non-transitory computer readable medium, the operations include generating, by the computing system and based at least in part on the data associated with the first user and the second user, a plurality of content event groupings. In the example transitory or non-transitory computer readable medium, the operations include obtaining, by the computing system, from a client device, a request for transmission of data comprising the plurality of content event groupings. In the example transitory or non-transitory computer readable medium, the operations include transmitting, by the computing system to the client device, content event data comprising the plurality of content event groupings. In the example transitory or non-transitory computer readable medium, the operations include obtaining, by the computing system, data comprising a plurality of de-identified content-location event pairs. In the example transitory or non-transitory computer readable medium, the operations include inputting, by the computing system, the plurality of de-identified content-location event pairs into an attribution pipeline. In the example transitory or non-transitory computer readable medium, the operations include obtaining, by the computing system from the attribution pipeline, output comprising data indicative of conversions attributed to specific content-location event pairs.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
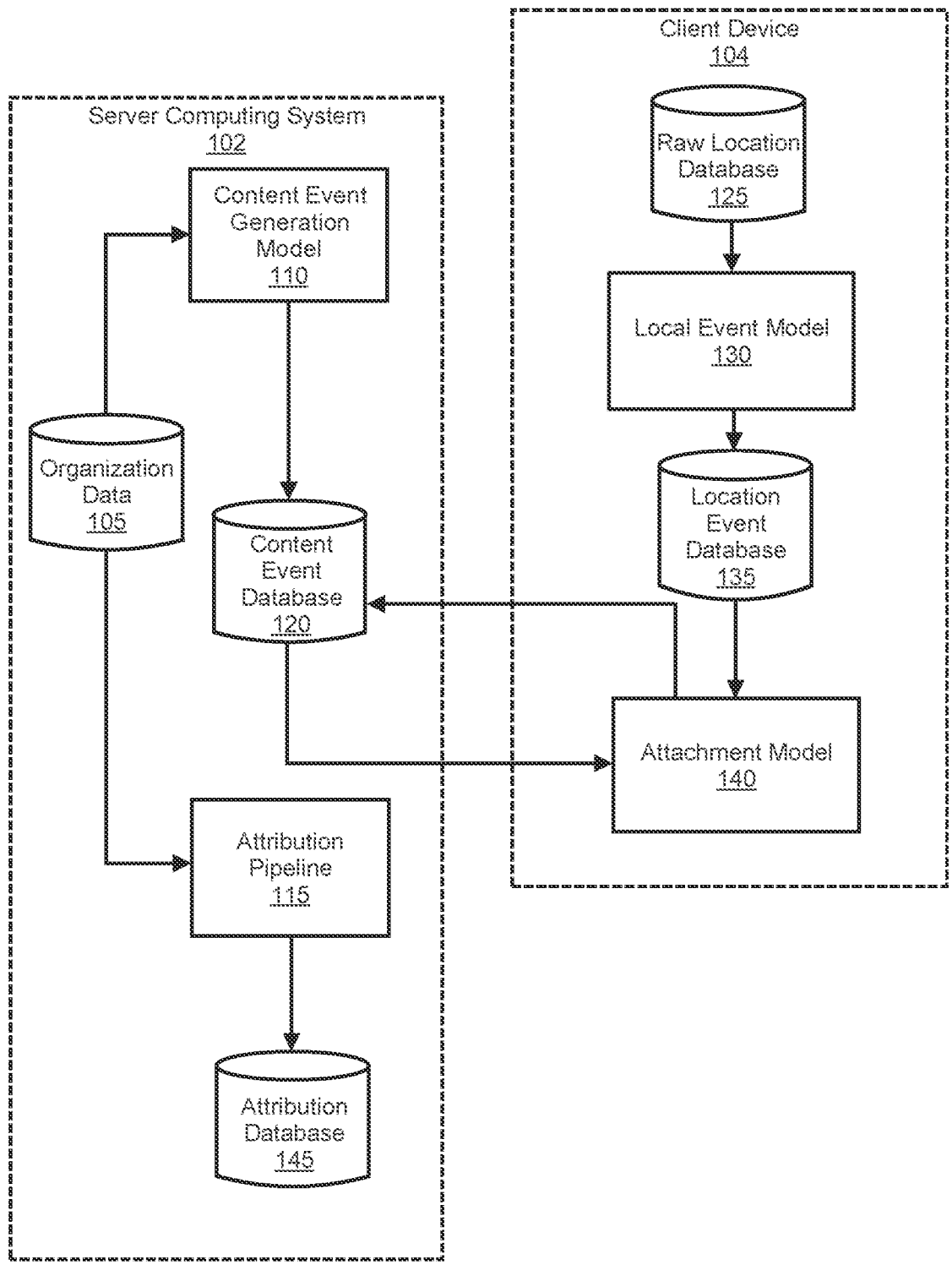
FIG. 1 depicts an example flow chart diagram of an example data flow for utilizing on-device location history for content event analytics according to example embodiments of the present disclosure.

Generally, the present disclosure is directed to using on-device location history in content item analytics. The on-device location history allows for increased user privacy by sending only relevant de-identified data to a server computing system. The present disclosure provides for a content event generation component, a visit attachment model, and an attribution pipeline. Each phase in the process has been modified to facilitate processing location data on a user device to prevent unnecessary location history data from being transmitted off the user device.

The method can include creating content event groupings for users (e.g., users associated with organizations). For example, content events associated with a first organization can be grouped together and content events associated with a second organization can be grouped together (and separate from the first organization's grouped events). These groupings of content events can be referred to as "data structures". The server computing system can be associated with a service for organization (e.g., content provider, company) or other users for facilitating serving content (e.g., content items) to client devices.

In an example, organizations can include at least a first department store and a second department store. The first department store and the second department store can be associated with distinct brands and can have one or more brick and mortar stores located within a geographic area. The server computing system can generate a data structure for the first department store and the second department store. The data structure can include one or more content events (e.g., user clicks, displaying of a content item, user conversion, and the like) associated with the respective department stores.

A client device (e.g., user device, smartphone, computer, and the like) can send a request to a server computing system for the system to transmit data structures containing events to the user device. In response, the data structures can be transmitted by the server computing system to the client device. Using the data structures obtained from the server computing system and location data stored on the user device as input, an attachment model can pair specific location events (e.g., associated with raw location data from the user device) to respective content event data structures (e.g., obtained from the server computing system). By way of example, a user's on-device location history can indicate that the user has visited several brick-and-mortar store locations over the past few days, weeks, or months. For example, the user can visit a coffee shop, a first department store, a second department store, and a grocery store.

An attachment model on the user device can pair various content events with various location history events. The attachment model can produce groupings of content event and location event pairs (e.g., content-location pairs) as output. The groupings of content-location event pairs can be associated with respective organization (e.g., store brand) content events being grouped together. Storing the content-location pairs by organization can prevent sharing location history across organizations and prevent sending location history data off-device that is not relevant to any of the organization's content events.

The content-location event pairs can be de-identified on the client device (e.g., using a keyless hash function) and can be transmitted to the server computing system from the client device. All processing of raw user location history can be performed on the client device.

The server computing system can obtain the de-identified content-location event pairs and provide the de-identified content-location event pairs as input into an attribution pipeline. Attribution for each content-location event pair can be determined. Analytics indicative of attribution of various conversions for various content-location event pairs can be performed. For instance, the attribution pipeline can include a plurality of attribution models. The models can include at least one of a store determination model, a conversion model, a timeline model, and a data driven attribution model.

The attribution pipeline can include obtaining the attribution data (e.g., from one or more attribution models) and de-identifying the attribution data. For instance, the attribution data can be de-identified a second time (e.g., by the server computing system using a keyed has function). The double de-identified attribution data can be stored in a data store on the server computing system. The double de-identified data can be used as training data. The training data can be used to train one or more machine learned models or extrapolate the calculated attribution to all content events. The attribution data can be provided for display to the users (e.g., content providers, department stores) via a user interface of a device associated with the respective users.

The present disclosure provides for a technical solution to this technical problem by increasing user privacy and preventing unnecessary sharing of location data off a user device. The present disclosure provides for improved systems and methods for processing user location history data on the user device. Additionally, the system and methods provide for only transmitting de-identified content-location event pairs to the server computing system and keeping the content-location event pairs separated based on users. An additional benefit of the present solution includes that a user (e.g., associated with an organization) will only have access to data that is relevant to a content event of that specific user. This also reduces bandwidth usage and increases efficiency of computing resources by decreasing the amount of data transmitted from a user device to a server computing system. Additionally, the data will be de-identified before being used by the server computing system to perform an attribution method. The improvements associated with the systems and methods discussed herein can be further understood with reference to the figures.

FIG. 1 depicts a block diagram of an example data flow 100 between server computing system 102 and client device 104. The server computing system 102 can include a database for storing organization data 105. Organization data 105 can be data associated with an organization. For instance, organization data 105 can include a brand identifier, user identifiers, one or more store locations or one or more content item exposure events. Organization data 105 can be used as an input into content event generation model 110 or attribution pipeline 115.

Content event generation model 110 can obtain organization data 105 as input. Organization data can be data associated with a plurality of organizations (e.g., content providers, stores). Content event generation model 110 can generate one or more content events in the form of a data structure as output. The one or more content events can be transmitted to, or stored in, content event database 120. Content event database 120 can transmit data comprising the one or more content event data structures to attachment model 140. Additionally, or alternatively, attachment model 140 can transmit data to content event database 120 (e.g., de-identified content-location event pairs).

Client device 104 can include a raw location database 125. The raw location database can include location data points associated with the client device 104. The raw location data will be discussed in more detail with regards to FIG. 3. Location event model 130 can obtain raw location data as input in the model. Location event model 130 can generate one or more location events based on the raw location data. Client device 104 can store the one or more location events in location event database 135.

Attachment model 140 can obtain input comprising content event data from the content event database 120 on server computing system 102 or location event database 135 on client device 104. Attachment model 140 can match individual content events from content event database 120 with one or more location events from location event database 135 to generate one or more organization pairs (e.g., as described with respect to FIG. 4). In some implementations the attachment model 140 can include performing a hash function on one or more content-location event pairs to generate one or more de-identified content-location event pairs. The one or more de-identified content-location event pairs can be transmitted from client device 104 to attribution pipeline 115 on server computing system 102.

Attribution pipeline 115 can obtain de-identified content-location pairs and perform one or more attribution processes. Attribution pipeline 115 can use the de-identified content-location pairs as input to extrapolate conversions or other attribution related metrics (e.g., as described with regard to FIG. 5). Attribution pipeline 115 can be a model-based approach that consumes real data (e.g., de-identified content-location event pairs) to determine a likelihood that a target user action (e.g., conversion, click, physical store visit) occurred based on features of the content events. Outputs of attribution pipeline 115 can include an indication of whether a target action was performed in response to a user's exposure to a content event. Output can additionally, or alternatively, include what store location was associated with the target action, whether a target action was performed in response to a user's exposure to a content event, a timeline between when the exposure to a content event occurred and when the target action was performed, or a data driven attribution model.

In some implementations, output from attribution pipeline 115 can be de-identified and stored in attribution database 145. In some instances, the double de-identified attribution data can be used to train one or more models associated with server computing system 102 or client computing device 104. Further details of data flow 100 will be described with regard to FIG. 2-FIG. 5.

Figure 2:
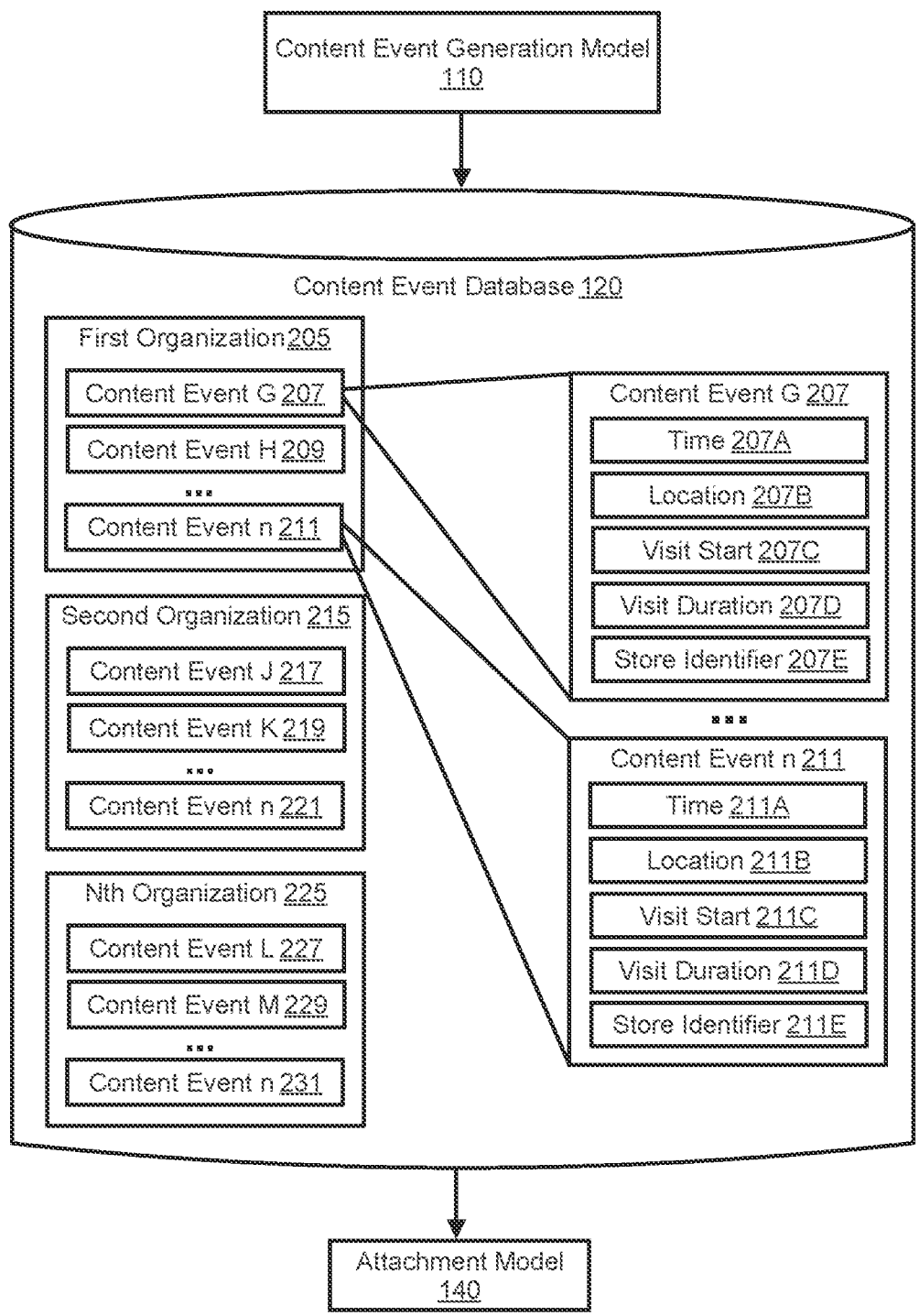
FIG. 2 depicts an example flow chart diagram of an example data flow for utilizing on-device location history for content event analytics according to example embodiments of the present disclosure.

FIG. 2 depicts example data flow from content event generation model 110 to content event database 120 to attachment model 140. Content event generation model 110 can obtain organization data (e.g., organization data 105) associated with a plurality of organizations and generate content events for each respective organization. Output of content event generation model 110 can be stored in content event database 120.

Content event generation model 110 can obtain a plurality of content events (e.g., exposure of content items to users) and group them based on organization. As depicted in FIG. 2, the content event generation model 110 can generate a content events data structure for a first organization 205, a second organization 215, or an Nth organization 225. Each organization can be associated with one or more content events. For instance, first organization 205 can be associated with content event G 207, content event H 209, or content event n 211. Second organization 215 can be associated with content event J 217, content event K 219, or content event n 221. Nth organization 225 can be associated with content event L 227, content event M 229, or content event n 231.

Each respective content event can have associated content event data. For instance, content event data can include, time, location, visit start, visit duration, or store identifier. For illustrative purposes, content event G 207 and content event n 211 are depicted in an expanded view including the associated content event data. By way of example, content event G 207 can include time 207A, location 207B, visit start 207C, visit duration 207D, or store identifier 207E. For instance, content event n 211 can include time 211A, location 211B, visit start 211C, visit duration 211D, or store identifier 211E.

Content event data can be illustrative of data that would be expected to be obtained from a user device that was exposed to the content event. For instance, a content event can be associated with a discount for a product that is sold at a particular physical location of a first department store. In response to a user device displaying a content item associated with the discount for the item, it can be expected that the user device would have a location event at the physical location associated with the department store within a threshold time of the user device displaying the content item. For instance, the content item can indicate a timeframe within which the discount will remain in effect (e.g., through the following weekend, within a few days).

The content event data structure can contain data that will help the on-device attachment model 140 pair content events of the respective organizations with on-device location events (e.g., stored in location events database 135). For instance, attachment model 140 can compare expected time, location, visit start, visit duration, or store identifier that would be expected to be associated with a user that viewed a content item and, in response, visited a physical location.

A respective content event can include a content item provided for display via a user interface of a user device associated with a user. For instance, a user device can include client device 104. One or more first party or third party systems can be utilized to determine one or more content items to provide for display via a user interface of client device 104. Content items can include content relating to one or more third-parties that includes information about products or services associated with the respective third-parties (e.g., organizations, stores, brands, and the like). In some implementations, content items can include promotions, discounts, and the like to encourage one or more users associated with client device 104 to perform an action (e.g., complete a conversion or visit a brick-and-mortar store location).

Each respective content event can include a time that the content event occurred (e.g., time 207A, time 211A). The respective content events can include a location of a targeted user action (e.g., location 207B, location 211B). The location can be a location associated with a specific brick-and-mortar location wherein the target action (e.g., conversion) includes a user device that has displayed the content item associated with the content event being co-located with the specific brick-and-mortar location within a threshold time period of time 207A.

By way of example, first organization 205 can be a large department store with multiple brick-and-mortar locations in a geographic area. Second organization 215 can be a grocery store with multiple brick-and-mortar locations in the same geographic area. A geographic area can include a neighborhood, zip code, city, state, region, or other defined geographic space. First organization 205 and second organization 215 can include some brick-and-mortar locations that are located within a threshold distance of each other. For instance, a department store and grocery store can share a parking lot, be located within the same block, or otherwise similarly located.

Content event G 207 can be associated with first organization 205 and can be associated with a respective time 207A, location 207B, visit start 207C, visit duration 207D, or store identifier 207E. Time 207A can be associated with when a content item was transmitted for display via a user interface associated with a user device (e.g., client device 104). Location 207B can be associated with a physical location of a first organization located within the geographic area (e.g., same city or state as a user device). Visit start 207C can represent an expected visit start time. The expected visit start time can be a range of times at which a user would be expected to begin a visit to location 207B of first organization 205. Visit duration can be an expected time that a user would spend inside location 207B. For instance, a user may spend a longer amount of time at a department store for an afternoon of shopping compared to a quick trip to a gas station or pharmacy. Additionally, or alternatively, content G 207 can include store identifier 207E. For instance, store identifier 207E can include one or more store identifiers for respective store locations. In some instances, first organization 205 can have a single physical store location in a geographic area. In some instances, first organization 205 can be associated with a plurality of physical store locations within a geographic area.

In some implementations, content events can be targeted to driving user conversion to a particular physical store location associated with an organization. In such an instance, the store identifier (e.g., store identifier 207E, store identifier 211E) can help distinguish between two different content events that are displayed via the same user device (e.g., client device 104, associated with a single user).

Attachment model 140 can obtain the plurality of content events and the plurality of location events to pair the respective content events and location events together on a user device (e.g., client device 104).

Figure 3:
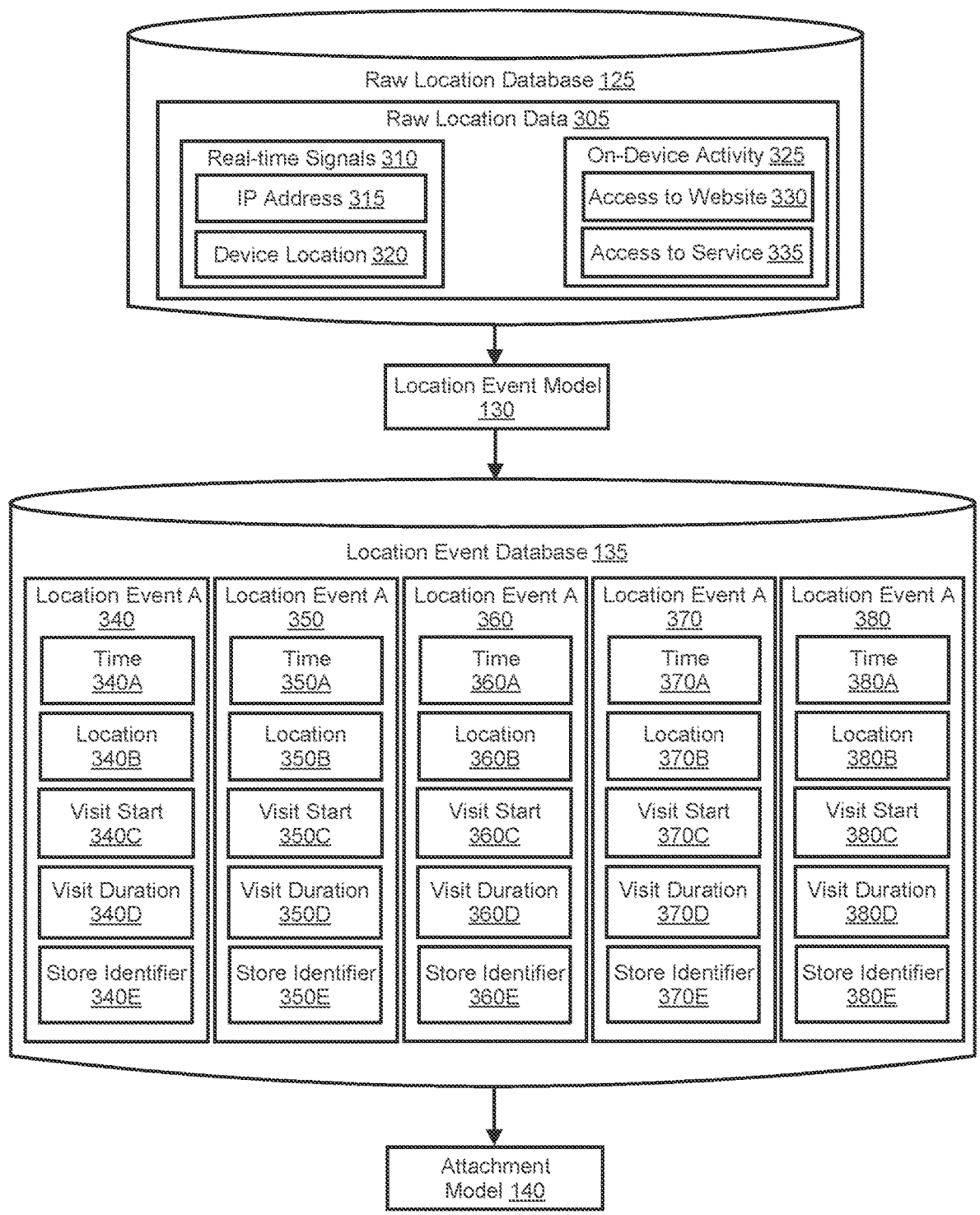
FIG. 3 depicts an example flow chart diagram of an example data flow for utilizing on-device location history for content event analytics according to example embodiments of the present disclosure.

FIG. 3 depicts a portion of data flow related to location event model 130 generating a plurality of location events based on raw location data 305 obtained from raw location database 125. In some implementations, the location event model 130 can infer place visits (e.g., to particular physical store locations) based on raw location data 305.

Raw location database 125 can include raw location data 305. Raw location data 305 can be obtained from, and stored on, a user device (e.g., client device 104). Raw location data 305 can include real-time signals 310 and on-device activity 325. Real-time signals can include IP address 315 data and device location 320 data. On-device activity 325 can include access to website 330 and access to service 335.

Real-time signals 310 can include a plurality of signals indicative of real-team or near real-time location. For instance, IP address 315 data can include data indicative of a user's IP address at a particular moment in time. In some instances, raw location data 305 can include historical location data. For instance, historical location data can be prior signals indicative of a device location. Device location 320 data can include, for example, global positioning system (GPS) data, Wi-Fi data, mobile network data, device sensor data, Bluetooth data, or other location data.

On-device activity 325 data can include data indicative of access to website 330 and access to service 335. For instance, a user device (e.g., client device 104) can obtain user input indicative of a search, navigation to a website, utilization of an application associated with a service (e.g., service entity), or other user input. In some instances access to website 330 or access to service 335 can include a user input indicative of a location.

For instance, a user can provide input for a search for "grocery stores near me." By way of example, a user can disable location services (e.g., that obtain more real-time signals indicative of device location) and the user may be presented with results relating to a last known location or a location that is not their current location. In response, a user may provide clarification of a particular address of a store they are looking for, a specific road, or a specific city. In some instances, a user can begin a query by searching for a "grocery store in city A." Based on the follow-up search, the system can determine that the user device is located in city A.

The real-time signals 310 and on-device activity 325 data can be obtained as input into location event model 130. Location event model 130 can obtain raw location data 305 and generate a plurality of location events. For instance, location event model 130 can generate location event A 340, location event B 350, location event C 360, location event D 370, and location event E 380. Each respective location event can include associated data.

For instance, associated location event data can include time, location, visit start, visit duration, or store identifier. By way of example, location event A 340 can be associated with time 340A, location 340B, visit start 340C, visit duration 340D, or store identifier 340E. Location event B 350 can be associated with time 350A, location 350B, visit start 350C, visit duration 350D, or store identifier 350E. By way of example, location event C 360 can be associated with time 360A, location 360B, visit start 360C, visit duration 360D, or store identifier 360E. By way of example, location event A 370 can be associated with time 370A, location 370B, visit start 370C, visit duration 370D, or store identifier 370E. By way of example, location event E 380 can be associated with time 380A, location 380B, visit start 380C, visit duration 380D, or store identifier 380E.

Location event model 130 can be a geographic model configured to generate location events and associated location event data (e.g., metadata).

Figure 4:
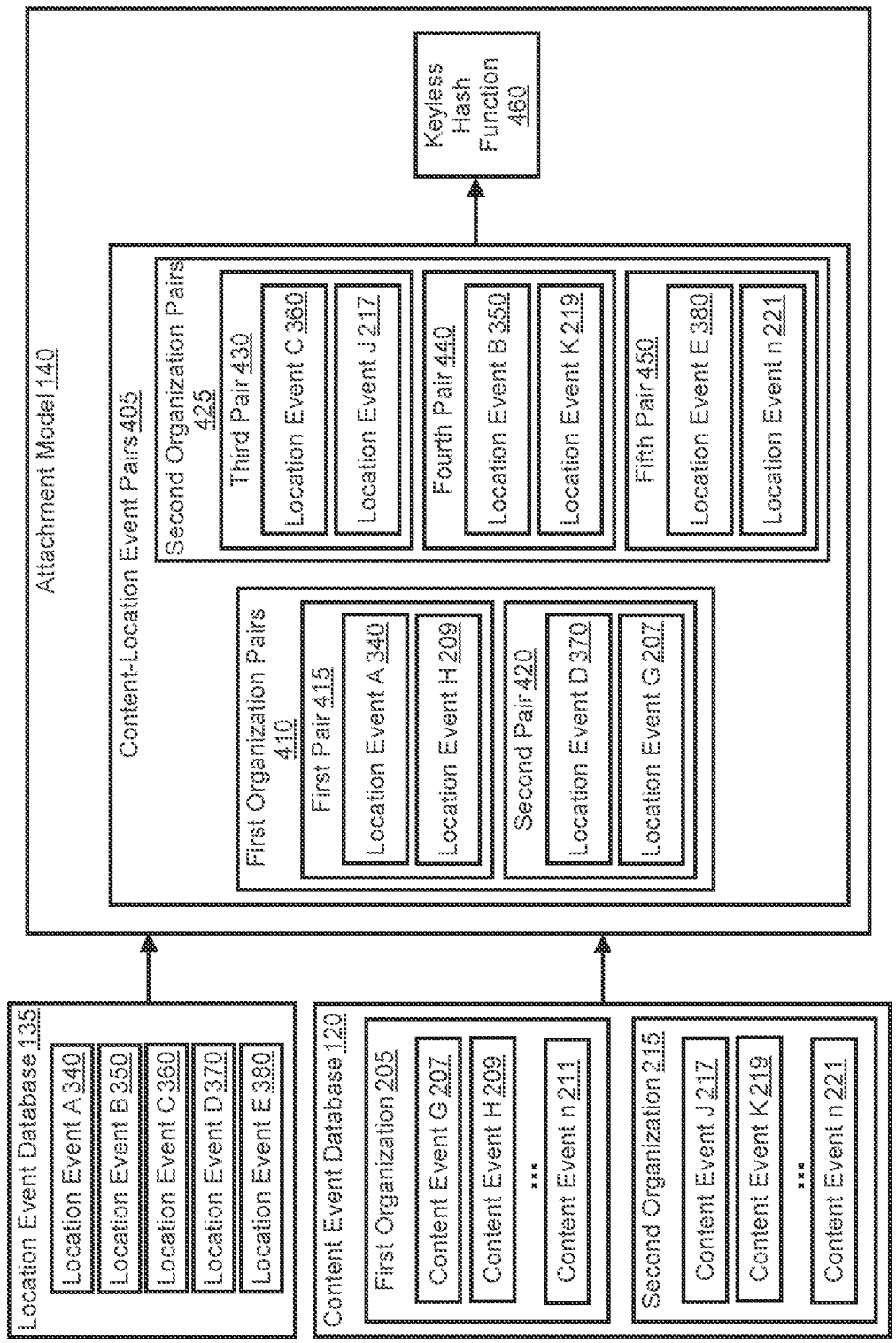
FIG. 4 depicts an example flow chart diagram of an example data flow for utilizing on-device location history for content event analytics according to example embodiments of the present disclosure.

As depicted in FIG. 4, attachment model 140 can obtain location event data from location event database 135 (as described in FIG. 3) and content event database 120 (as described in FIG. 2). Attachment model 140 can generate content-location event pairs 405.

Content-location event pairs 405 can include first organization pairs 410 associated with first organization 205 and second organization pairs 425 associated with second organization 215. The content-location event pairs 405 can be separated based on the respective organization.

The separation of content-location event pairs by organizations can provide for keeping content-location event data separated and preventing the oversharing of (de-identified) data with organizations that are not associated with the respective content-location event pairs. For instance, data associated with a content-location event pair of a department store will not be shared with a grocery store and data associated with a content-location event pair of the grocery store will not be shared with the department store.

Attachment model 140 can generate pairs of location events (e.g., location event A 340, location event B 350, location event C 360, location event D 370, or location event E 380) with respective content events (e.g., content event G 207, content event H 209, content event n 211, content event J 217, content event K 219, or content event n 221). For instance, the attachment model 140 can compare the data associated with each respective location event with each respective content event to match the content events with location events.

For example, content event H 209 can be a content event with a time associated with a weekend, a location as a department store (associated with first organization 205) located at 123 Main Street, an expected visits start time between the hours of 3:00 PM and 6:00 PM, an expected visit duration of 1 hour, or a store identifier associated the 123 Main Street location of the department store. A location event A 340 can be a location event on the client device indicating that the client device was within 0.1 miles of the 123 Main Street location of department store (e.g., associated with first organization 205), on a Saturday afternoon, with a visit start time of 3:30 PM and a visit duration of 1.5 hours. Based on the similarity of the data associated with content event H 209 and location event A 340, the attachment model 140 can generate first pair 415 comprising location event A 340 and content event H 209.

Content-location event pairs 405 can be divided into pairs associated with specific organizations. This can allow for improved security by only providing data indicative of conversions (e.g., content-location event pairs) to the relevant organization.

By way of example, first organization pairs 410 can include first pair 415 and second pair 420. First pair 415 can include location event A 340 and content event H 209. Second pair 420 can include location event D 370 and content event G 207. Second Organization pairs 425 can include third pair 430, fourth pair 440, and fifth pair 450. Third pair 430 can include Location event C 360 and content event J 217. Fourth pair 440 can include location event B 350 and content event K 219. Fifth pair 450 can include location event E 380 and content event n 221.

Client device 104 can use one or more hash functions to de-identify the content-location pairs. For instance, the hash function can be a keyless hash function 460. The keyless hash function 460 can be applied to the content-location event pairs 405 to generate de-identified content-location event pairs.

Figure 5:
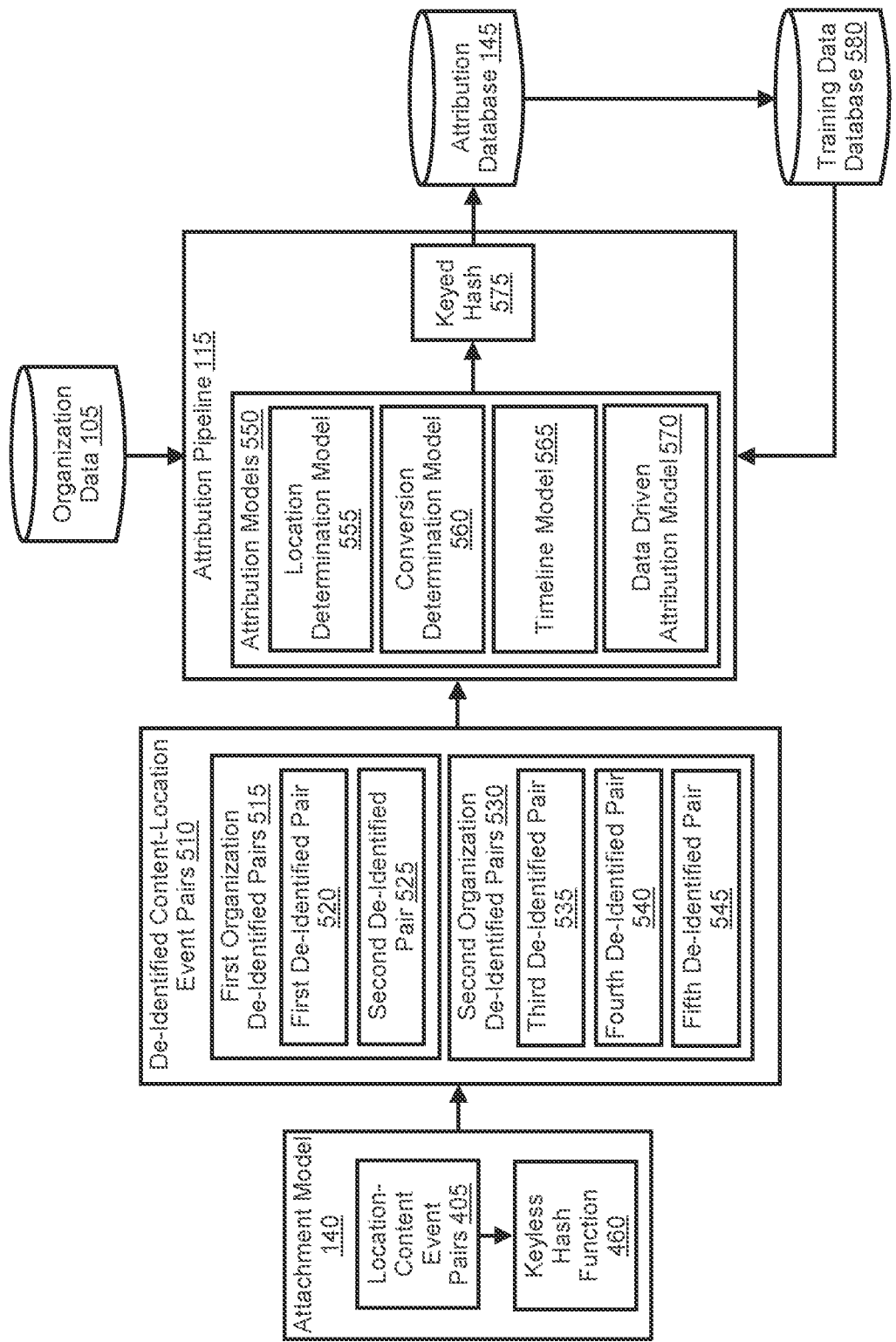
FIG. 5 depicts an example flow chart diagram of an example data flow for utilizing on-device location history for content event analytics according to example embodiments of the present disclosure.

As depicted in FIG. 5 keyless hash function 460 can be utilized to generate an output of de-identified content-location event pairs 510. Keyless hash function 460 can be used as part of attachment model 140. In some implementations, the de-identified content-location event pairs 510 can be separated based on the associated organization. For instance, first organization de-identified pairs 515 can include first de-identified pair 520 and second de-identified pair 525. Second organization de-identified pairs 530 can include third-de-identified pair 535, fourth de-identified pair 540, and fifth de-identified pair 545.

De-identified content-location event pairs 510 can be transmitted from attachment model 140 on a user device (e.g., client device 104) to an attribution pipeline 115 on a server computing system (e.g., server computing system 102).

Attribution pipeline 115 can obtain the de-identified content-location event pairs 510 and organization data 105. Attribution pipeline 115 can include one or more models capable of performing an attribution method for a plurality of organizations. Attribution pipeline 115 can generate output comprising at least one of whether (i) a user (e.g. associated with client device 104) interacted with a content item (e.g., associated with a content event) and then visited a physical store location (e.g., associated with a location event) or (ii) if a user device was physically located at a physical store location (e.g., associated with an organization associated with a content event). In some implementations, the method can be a fine-tuned attribution method that is tailored to respective organizations (e.g., content providers, companies). For instance, each organization can have associated features or settings. Settings can include, for example, allocating an attribution once per click (e.g., content event interactions), allocating multiple attributions for multiple clicks (e.g., content event interactions), allocating one attribution for multiple clicks (e.g., content event interactions), settings, content campaign overrides (e.g., ignoring specific store locations, focusing on a specific geographical area).

Attribution pipeline 115 can include one or more attribution models. For instance, attribution models 550 can include at least one of (i) a location determination model, (ii) a conversion determination model, (iii) a timeline model, or (iv) a data driven attribution model.

For instance, the location determination model can be location determination model 555. Location determination model 555 can determine if a user device was located at a physical store location or which physical store location the user device was located at.

A conversion determination model can be conversion determination model 560. Conversion determination model 560 can determine whether a conversion occurs. For instance, conversion determination model 560 can determine that given a content event, a conversion occurred (e.g., a user device that displayed a content item associated with a content event also had an associated location event indicative of the user device visiting a physical store location associated with the content event). In some implementations, conversion determination model 560 can determine that multiple content events contributed to a related location event. The conversion determination model 560 can determine an attribution percentage to each respective content event of the plurality of content events for the respective location event.

A timeline model can include timeline model 565. Timeline model 565 can determine a timeline between one or more content events and one or more location events. For instance, timeline model 565 can determine a time of a plurality of content events and whether respective location events are within a time threshold (e.g., number of days, weeks, months, and the like).

A data driven attribution model can include DDA model 570. DDA model 570 can determine that a conversion has occurred. For instance, DDA model 570 can determine that a user performed a target action (e.g., visited a physical store location) following a content event (e.g., exposure to a content item). In response to determining that a conversion has occurred, DDA model 570 can determine an attribution for each content event of a plurality of content events that led up to the respective conversion (e.g., location event).

Attribution pipeline 115 can generate output indicative of which content events should be attributed to which location events (e.g., store visits). In some implementations, this can be performed once per organization per day per data structure. This approach can avoid overreporting data to a user device associated with the respective organization. This can also allow for technical improvements by preventing unnecessary or redundant data transmission and bandwidth usage. In some implementations, this can be performed a number of times per organization per day per data structure.

The present disclosure provides for additional user privacy related to location data. This modified pipeline removes the direct link between user location data events and a server computing system associated with managing content providers content delivery and analysis of the performance of various content items in increasing target user actions (e.g., conversions, visits to store locations). The present disclosure keeps all identifiable location data on the user device. And a new data state is computed each time de-identified data is pushed to the server computing system or pulled from the client device.

In some implementations, a second hash function (e.g., keyed hash function) can be applied to the attribution data. The double de-identified data can be used as training data for one or more models (e.g., one or more attribution models associated with attribution pipeline 115).

The attribution pipeline 115 can include applying a keyed hash function 575 to the data obtained from one or more models of attribution models 550. Keyed hash function 575 can be used to generate hashed attribution data to be stored in attribution database 145.

Attribution Database 145 can store the attribution data obtained from attribution pipeline 115. Attribution data can include, for instance, data associated with one or more conversions (e.g., target actions performed by a user).

In some instances, attribution data from attribution database 145 can be stored in a training data database 580. Training data in training data database 580 can be used to train one or more attribution models 550 in attribution pipeline 115. Training data can include data associated with double-hashed conversion events (e.g., double de-identified events).

Additional security can be provided by a double-hashing approach that can be applied to attribution data that can be saved and utilized as training data for one or more models (e.g., attribution models 550). The on-device location model can be small in size to provide for reduced bandwidth usage to provide for improved processing on the user device.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In some implementations, a user will give explicit consent relating to the transmission of any data (e.g., the de-identified data off device and restrict the amount of time that the data is stored on the server (e.g., default value of 1 day, 7 days, 30 days, and the like). In some implementations, data can be double de-identified (e.g., double-hashed) and a user can provide explicit consent to allow the double de-identified data to be stored for any amount of time (e.g., a week, a month, a year, and the like).

Figure 6:
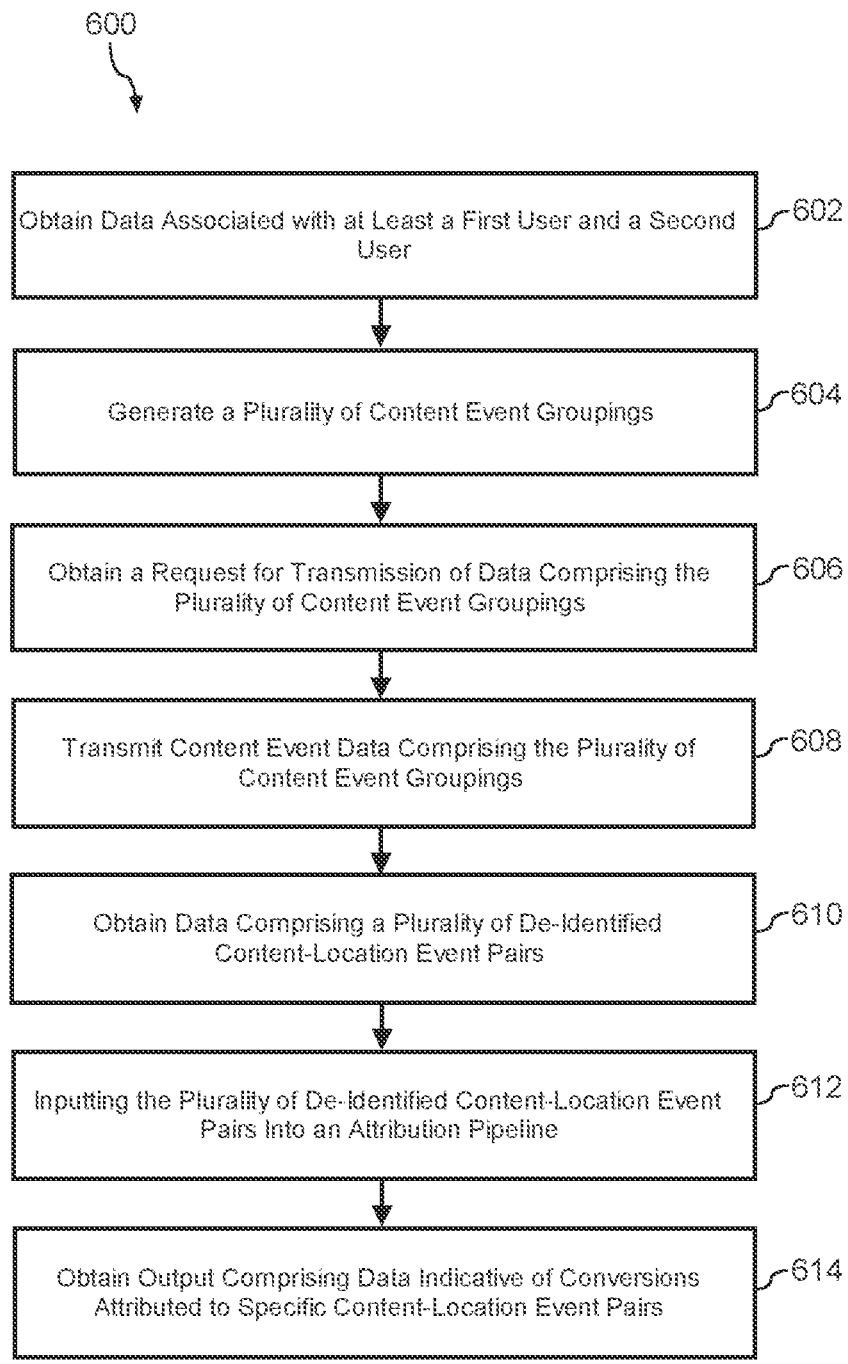
FIG. 6 depicts a flow chart diagram of an example method to utilize on-device location history for content item analytics according to example embodiments of the present disclosure

FIG. 6 depicts a flow chart diagram of an example method 600 for utilizing on-device location handling for content event analytics. Although FIG. 6 depicts steps performed in a particular order for purposes of illustration and discussion, the methods of the present disclosure are not limited to the particularly illustrated order or arrangement. The various steps of method 600 can be omitted, rearranged, combined, or adapted in various ways without deviating from the scope of the present disclosure.

At (602), method 600 can include obtaining data associated with at least a first user and a second user. For instance, a computing system (e.g., computing system 700) can obtain data associated with at least a first user and a second user. As described herein, the first user can be associated with a first organization and the second user can be associated with a second organization.

At (604), method 600 can include generating a plurality of content event groupings. For instance, a computing system (e.g., computing system 700) can generate a plurality of content event groupings. By way of example, the content event groupings can include a first grouping of content events associated with the first organization and a second grouping of content events associated with the second organization.

At (606), method 600 can include obtaining a request for transmission of data comprising the plurality of content event groupings. For instance, a computing system (e.g., computing system 700) can obtain a request for transmission of data comprising the plurality of content event groupings. As described herein, a client device can send a request to a server computing system for one or more content event groupings. The content event groupings can include a first content event grouping associated with the first organization and a second content event grouping associated with the second organization.

At (608), method 600 can include transmitting content event data comprising the plurality of content event groupings. For instance, a computing system (e.g., computing system 700) can transmit content event data comprising the plurality of content event groupings. As described herein, the server computing system can send one or more data structures comprising the first content event grouping associated with the first organization and the second content event grouping associated with the second organization.

At (610), method 600 can include obtaining data comprising a plurality of de-identified content-location event pairs. For instance, a computing system (e.g., computing system 700) can obtain data comprising a plurality of de-identified content-location event pairs.

As described herein, one or more content-location event pairs can be generated on the client device. The one or more content-location event pairs can be de-identified on the user device. The content-location event pairs can remain in content event groupings based on the associated organizations. The client device can transmit data structures comprising the grouped de-identified content-location event pairs to the server computing system. The server computing system can obtain the one or more de-identified content-location event pairs.

At (612), method 600 can include inputting the plurality of de-identified content-location event pairs into an attribution pipeline. For instance, a computing system (e.g., computing system 700) can input the plurality of de-identified content-location event pairs into an attribution pipeline. As described herein, the one or more de-identified content-location pairs can be provided as input into the attribution pipeline. The attribution pipeline can employ any current or anticipated attribution methods to determine an attribution to allocate to various content events based on location events (e.g., content-location event pairs).

At (614), method 600 can include obtaining output comprising data indicative of conversions attributed to specific content-location event pairs. For instance, a computing system (e.g., computing system 700) can obtain output comprising data indicative of conversions attributed to specific content-location event pairs. As described herein, the server computing system can provide an output comprising attribution to specific content-location event pairs. Attribution can include a last click attribution method, data driven attribution method, and the like.

Figure 7:
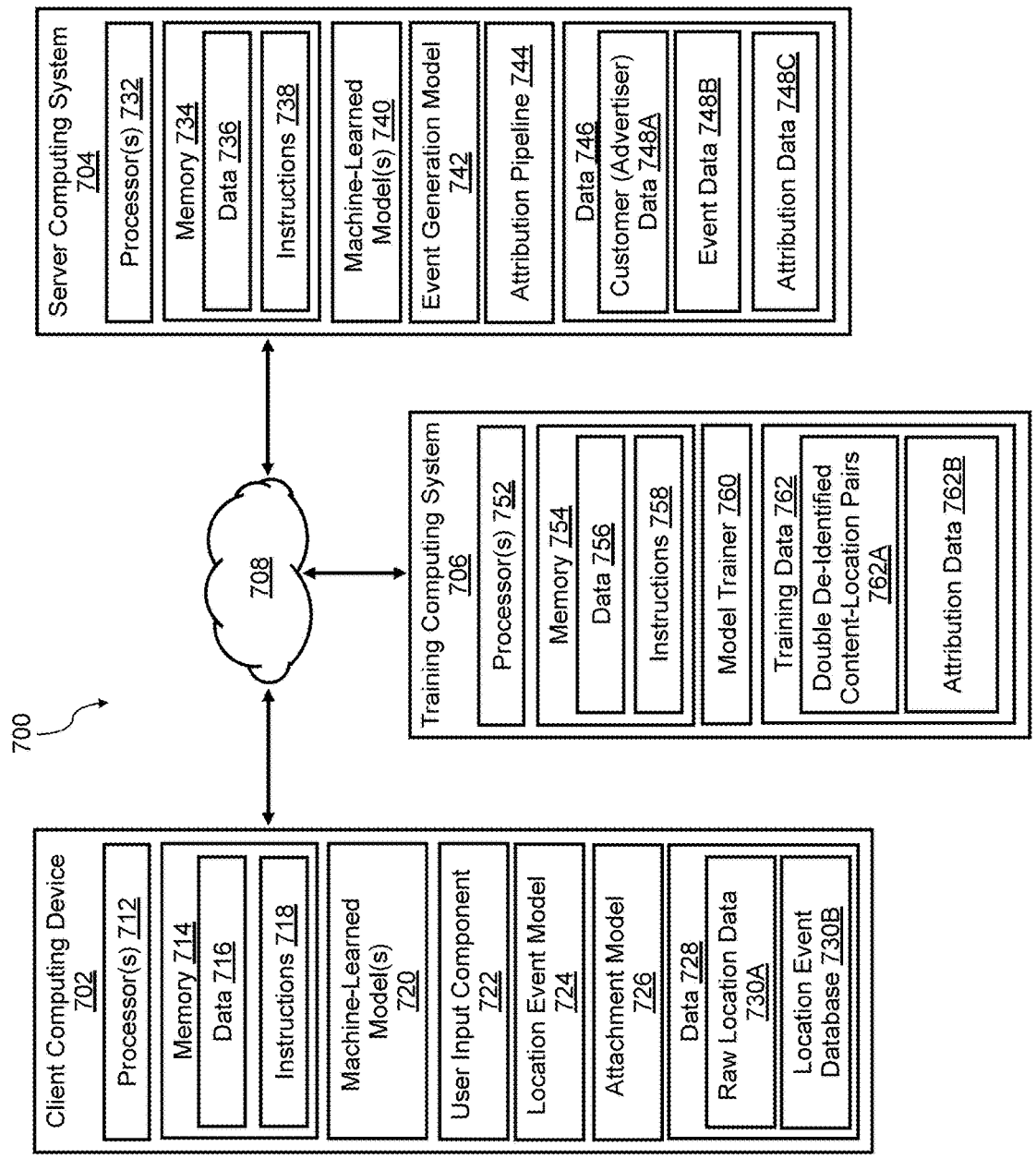
FIG. 7 depicts an example block diagram of a system for utilizing on-device location history for content item analytics according to example embodiments of the present disclosure.

FIG. 7 depicts a block diagram of an example computing system 700 that utilizes on-device location handling for content events according to example embodiments of the present disclosure. The computing system 700 includes a client computing system 702, a server computing system 704, and a training computing system 706 that are communicatively coupled over a network 708.

The client computing system 702 can include (or be) a user device. A user device can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing system 702 includes one or more processors 712 and a memory 714. The one or more processors 712 can be any suitable processing device (e.g., a processor core, a microprocessor, an ASIC, an FPGA, a controller, a microcontroller, and the like) and can be one processor or a plurality of processors that are operatively connected. The memory 714 can include one or more transitory or non-transitory computer-readable storage media, such as RAM, ROM, EEPROM, EPROM, flash memory devices, magnetic disks, and the like, and combinations thereof. The memory 714 can store data 716 and instructions 718 which are executed by the processor 712 to cause the client computing system 702 to perform operations.

In some implementations, the client computing system 702 can store or include one or more machine-learned models 720. For example, the machine-learned models 720 can be or can otherwise include various machine-learned models such as Bayesian belief networks, kernel-based regularized least squares regression. Bayesian belief networks can include probabilistic graphical models comprising nodes and directed edges and learned from data. Kernel-based regularized least square regression can include non-linear regression estimation. In some implementations machine-learned models 720 can be or can otherwise include neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 720 are discussed with reference to FIG. 1-FIG. 5.

In some implementations, the one or more machine-learned models 720 can be received from the server computing system 704 over network 708, stored in the user computing device memory 714, and then used or otherwise implemented by the one or more processors 712. In some implementations, the client computing system 702 can implement multiple parallel instances of a single machine-learned model 720 (e.g., to perform parallel learning across multiple instances of content event generation, location event generation, content-location event pair generation, or attribution).

More particularly, the overall model can include a plurality of machine-learned models for performing a plurality of functions. Functions can include, for example, generating content events or location events, generating content-location event pairs, or performing attribution.

Additionally or alternatively, one or more machine-learned models 740 can be included in or otherwise stored and implemented by the server computing system 704 that communicates with the client computing system 702 according to a client-server relationship. For example, the machine-learned models 740 can be implemented by the server computing system 704 as a portion of a web service (e.g., a marketing service). Thus, one or more models 720 can be stored and implemented at the client computing system 702 or one or more models 740 can be stored and implemented at the server computing system 704.

The client computing system 702 can also include one or more user input components 722 that receives user input. For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

Client computing system 702 can include one or more user interface(s). For example user interface(s) can include graphical user interfaces, audio user interfaces, command line interfaces, menu-driven user interfaces, touch user interface, voice user interface, form-based user interface, or natural language user interfaces.

The client computing system 702 can include a location event model 724. Location event model 724 can be used to generate one or more location events based on the raw location data.

The client computing system 702 can include an attachment model 726. Attachment model 726 can be used to pair one or more content events to location events on the client device.

The client computing system 702 can include data 728. Data can include raw location data 730A and location event database 730B. Raw location data 730A can include real-time signals and on-device activity (e.g., as discussed in FIG. 3). Location event database 730B can include one or more location events generated by location event model 724.

The server computing system 704 includes one or more processors 732 and a memory 734. The one or more processors 732 can be any suitable processing device (e.g., a processor core, a microprocessor, an ASIC, an FPGA, a controller, a microcontroller, and the like) and can be one processor or a plurality of processors that are operatively connected. The memory 734 can include one or more transitory or non-transitory computer-readable storage media, such as RAM, ROM, EEPROM, EPROM, flash memory devices, magnetic disks, and the like, and combinations thereof. The memory 734 can store data 736 and instructions 738 which are executed by the processor 732 to cause the server computing system 704 to perform operations.

In some implementations, the server computing system 704 includes or is otherwise implemented by one or more server computing devices. In instances in which the server computing system 704 includes plural server computing devices, such server computing devices can operate according to sequential computing architectures, parallel computing architectures, or some combination thereof.

As described above, the server computing system 704 can store or otherwise include one or more machine-learned models 740. For example, the models 740 can be or can otherwise include various machine-learned models. Machine-learned models 740 can include, for example, an event generation model (e.g., event generation model 742) or an attribution pipeline (e.g., attribution pipeline 744). Example machine-learned models include can be or can otherwise include various machine-learned models such as Bayesian belief networks, kernel-based regularized least squares regression. Bayesian belief networks can include probabilistic graphical models comprising nodes and directed edges and learned from data. Kernel-based regularized least square regression can include non-linear regression estimation. In some implementations machine-learned models 740 can be or can otherwise include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 740 are discussed with reference to FIG. 1-FIG. 5.

Server computing system 704 can include event generation model 742. Event generation model 742 can be utilized to generate one or more content events. Server computing system 704 can include attribution pipeline 744. Attribution pipeline 744 can be utilized to attribute one or more content events to one or more location events (e.g., conversions).

Server computing system 704 can include organization data 748A, event data 748B, and attribution data 748C. Organization data 748A can include data associated with one or more respective organizations. Event data 748 can include data indicative of one or more content events (e.g., generated by event generation model 742). Attribution data 748C can include attribution data generated by attribution pipeline 744.

The client computing system 702 or the server computing system 704 can train the models 720 or 740 via interaction with the training computing system 706 that is communicatively coupled over the network 708. The training computing system 706 can be separate from the server computing system 704 or can be a portion of the server computing system 704.

The training computing system 706 includes one or more processors 752 and a memory 754. The one or more processors 752 can be any suitable processing device (e.g., a processor core, a microprocessor, an ASIC, an FPGA, a controller, a microcontroller, and the like) and can be one processor or a plurality of processors that are operatively connected. The memory 754 can include one or more transitory or non-transitory computer-readable storage media, such as RAM, ROM, EEPROM, EPROM, flash memory devices, magnetic disks, and the like, and combinations thereof. The memory 754 can store data 756 and instructions 758 which are executed by the processor 752 to cause the training computing system 706 to perform operations. In some implementations, the training computing system 706 includes or is otherwise implemented by one or more server computing devices.

The training computing system 706 can include a model trainer 760 that trains the machine-learned models 720 or 740 stored at the client computing system 702 or the server computing system 704 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, or various other loss functions. Gradient descent techniques can be used to iteratively update the parameters over a number of training iterations.

In some implementations, performing backwards propagation of errors can include performing truncated backpropagation through time. The model trainer 760 can perform a number of generalization techniques (e.g., weight decays, dropouts, and the like) to improve the generalization capability of the models being trained.

In particular, the model trainer 760 can train the machine-learned models 720 or 740 based on a set of training data 762. The training data 762 can include, for example, data associated with double de-identified content-location pairs 762A or attribution data 762B.

In some implementations, if the user has provided consent, the training examples can be provided by the client computing system 702. Thus, in such implementations, the model(s) 720 provided to the client computing system 702 can be trained by the training computing system 706 on user-specific data received from the client computing system 702. In some instances, this process can be referred to as personalizing the model.

The model trainer 760 includes computer logic utilized to provide desired functionality. The model trainer 760 can be implemented in hardware, firmware, or software controlling a general purpose processor. For example, in some implementations, the model trainer 760 includes program files stored on a storage device, loaded into a memory and executed by one or more processors. In other implementations, the model trainer 760 includes one or more sets of computer-executable instructions that are stored in a tangible computer-readable storage medium such as RAM, hard disk, or optical or magnetic media.

The network 708 can be any type of communications network, such as a local area network (e.g., intranet), wide area network (e.g., Internet), or some combination thereof and can include any number of wired or wireless links. In general, communication over the network 708 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The machine-learned models described in this specification may be used in a variety of tasks, applications, or use cases.

In some implementations, the input to the machine-learned model(s) of the present disclosure can be statistical data. Statistical data can be, represent, or otherwise include data computed or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, and the like). As another example, the machine-learned model(s) can process the text or natural language data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

FIG. 7 illustrates one example computing system that can be used to implement the present disclosure. Other computing systems can be used as well. For example, in some implementations, the client computing system 702 can include the model trainer 760 and the training data 762. In such implementations, the models 720 can be both trained and used locally at the client computing system 702. In some of such implementations, the client computing system 702 can implement the model trainer 760 to personalize the models 720 based on user-specific data.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted or described steps are merely illustrative and can be omitted, combined, or performed in an order other than that depicted or described; the numbering of depicted steps is merely for case of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computer-implemented method, comprising:
   obtaining, by a computing system comprising one or more processors, data associated with at least a first user and a second user;
   generating, by the computing system and based at least in part on the data associated with the first user and the second user, a plurality of content event groupings;
   obtaining, by the computing system, from a client device, a request for transmission of data comprising the plurality of content event groupings;

transmitting, by the computing system to the client device, content event data comprising the plurality of content event groupings;
obtaining, by the computing system, data comprising a plurality of de-identified content-location event pairs;
inputting, by the computing system, the plurality of de-identified content-location event pairs into an attribution pipeline; and
obtaining, by the computing system from the attribution pipeline, output comprising data indicative of conversions attributed to specific content-location event pairs.

2. The method of claim 1, wherein the de-identified content-location event pairs are generated on the client device by:
obtaining location event data from a location event database;
obtaining the plurality of content event groupings; and
generating a plurality of content-location event pairs based on the location event data and the content event data.

3. The method of claim 2, wherein the de-identified content-location event pairs are generated on the client device by:
obtaining the plurality of content-location event pairs;
performing a first hash function on the plurality of content-location event pairs; and
obtaining hashed data indicative of the plurality of de-identified content-location event pairs.

4. The method of claim 3, wherein the plurality of de-identified content-location event pairs are grouped based on an association with the first user or the second user.

5. The method of claim 3, wherein the first hash function is a keyless hash function.

6. The method of claim 2, wherein the location event data comprises at least one of a (i) time, (ii) location, (iii) visit start, (iv) visit duration, or (v) store identifier.

7. The method of claim 1, wherein the content event groupings comprise a first content event grouping composed of one or more content events associated with the first user and a second content event grouping composed of one or more content events associated with the second user.

8. The method of claim 7, wherein the one or more content events comprises data associated with at least one of a (i) time, (ii) location, (iii) visit start, (iv) visit duration, or (v) store identifier.

9. The method of claim 1, comprising:
storing the data obtained as output from the attribution pipeline in an attribution database; and
using the stored data to (i) train one or more machine learned models and (ii) extrapolate a calculated attribution to content events.

10. The method of claim 9, wherein the data obtained as output from the attribution pipeline comprises at least one of (ii) a conversion or (ii) a click.

11. The method of claim 1, wherein the first user is associated with a first organization and the second user is associated with a second organization.

12. The method of claim 1, wherein the attribution pipeline comprises one or more attribution models.

13. The method of claim 12, wherein the one or more attribution models comprises at least one of: (i) a location determination model, (ii) a conversion determination model, (iii) a timeline model, or (iv) a data driven attribution model.

14. The method of claim 12, wherein the one or more attribution models comprises machine learned models.

15. The method of any of claim 12, wherein the attribution pipeline comprises applying a second hash function to the data obtained from the one or more attribution models.

16. The method of claim 15, wherein the second hash function comprises a keyed hash function.

17. A computing system, comprising:
one or more processors; and
one or more computer-readable media storing instructions that are executable to cause the one or more processors to perform operations, the operations comprising:
obtaining, by the computing system comprising one or more processors, data associated with at least a first user and a second user;
generating, by the computing system and based at least in part on the data associated with the first user and the second user, a plurality of content event groupings;
obtaining, by the computing system, from a client device, a request for transmission of data comprising the plurality of content event groupings;
transmitting, by the computing system to the client device, content event data comprising the plurality of content event groupings;
obtaining, by the computing system, data comprising a plurality of de-identified content-location event pairs;
inputting, by the computing system, the plurality of de-identified content-location event pairs into an attribution pipeline; and
obtaining, by the computing system from the attribution pipeline, output comprising data indicative of conversions attributed to specific content-location event pairs.

18. The computing system of claim 17, wherein the de-identified content-location event pairs are generated on the client device by:
obtaining location event data from a location event database;
obtaining the plurality of content event groupings; and
generating a plurality of content-location event pairs based on the location event data and the content event data.

19. The computing system of claim 18, wherein the de-identified content-location event pairs are generated on the client device by:
obtaining the plurality of content-location event pairs;
performing a first hash function on the plurality of content-location event pairs; and
obtaining hashed data indicative of the plurality of de-identified content-location event pairs.

20. One or more non-transitory computer readable media storing instructions that are executable by one or more processors to perform operations comprising obtaining, by a computing system comprising one or more processors, data associated with at least a first user and a second user;
generating, by the computing system and based at least in part on the data associated with the first user and the second user, a plurality of content event groupings;
obtaining, by the computing system, from a client device, a request for transmission of data comprising the plurality of content event groupings;
transmitting, by the computing system to the client device, content event data comprising the plurality of content event groupings;
obtaining, by the computing system, data comprising a plurality of de-identified content-location event pairs;
inputting, by the computing system, the plurality of de-identified content-location event pairs into an attribution pipeline; and obtaining, by the computing system from the attribution pipeline, output comprising data indicative of conversions attributed to specific content-location event pairs.

* * * * *